(12) United States Patent
Parnell

(10) Patent No.: US 10,927,268 B1
(45) Date of Patent: Feb. 23, 2021

(54) COAT MAX

(71) Applicant: Tevian Parnell, Big Spring, TX (US)

(72) Inventor: Tevian Parnell, Big Spring, TX (US)

( * ) Notice: Subject to any disclaimer, the term of this patent is extended or adjusted under 35 U.S.C. 154(b) by 0 days.

(21) Appl. No.: 15/228,775

(22) Filed: Aug. 4, 2016

(51) Int. Cl.
*C09D 5/24* (2006.01)
*C09D 1/00* (2006.01)

(52) U.S. Cl.
CPC ............ *C09D 5/24* (2013.01); *C09D 1/00* (2013.01)

(58) Field of Classification Search
CPC ........... C04B 35/01; C04B 35/74; C09D 1/00; C09D 5/24
USPC ........................................................ 252/71
See application file for complete search history.

(56) References Cited

U.S. PATENT DOCUMENTS

2014/0197353 A1* 7/2014 Hong .................. C04B 35/01
252/71

FOREIGN PATENT DOCUMENTS

CN 105753425 * 7/2016 ............. C04B 28/24

* cited by examiner

*Primary Examiner* — Khanh T Nguyen
(74) *Attorney, Agent, or Firm* — Bruce A. Lev

(57) ABSTRACT

The present application refers to a novel coating compound and more specifically to a novel coating compound comprising 75% of an aluminum containing compound and 25% of a carbon containing compound, where said aluminum containing compound may either be graphene or graphene oxide and said carbon containing compound may either be graphene or graphene oxide. Upon reading this specification, it should be appreciated that, under appropriate circumstances, considering such issues as user preferences, design preference, structural requirements, marketing preferences, cost, available materials, technological advances, etc., other graphene arrangements such as, for example, graphene oxide, etc., may be sufficient.

10 Claims, 3 Drawing Sheets

COAT MAX

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of colloid systems and wetting agents, and more specifically relates to a continuous semiconductor solid phase.

2. Description of the Related Art

Coatings are thin layers of a material featuring some special properties that are applied over a surface often referred as "substrate". Coatings may be applied to improve adhesion, wettability, electrical and thermal conductivity, and for other reasons. For example, a substrate may have strong mechanical properties, but lacking of electrical conductivity. In this case coating the substrate with a proper coating may expand its range of applications.

Various attempts have been made to solve the above-mentioned problems, but, to the best understanding of the inventor, none of the inventions and patents currently available to the public, taken either singly or in combination, is seen to describe the invention as claimed.

Ideally, a coating material should provide improved electrical conductivity and, yet would benefits of the mechanical properties of the substrate to which it is associated, this operating reliably and at a modest expense. On the other hand, it would be a great improvement over the prior art to provide for a coating that not only improves the electrical conductivity of the substrate but also improves its tensile strength. Thus, a need exists for a reliable coating material designed to improve the electrical conductivity and the tensile strength of its substrate.

BRIEF SUMMARY OF THE INVENTION

In view of the foregoing disadvantages inherent in the known prior art, the present invention provides a novel composition for a coating that comprises 75% of alumina or aluminum and 25% graphene oxide. The general purpose of the present invention, which will be described subsequently in greater detail is to provide a coating material that not only improves over the electrical properties of the substrate but also make it stronger from the mechanical point of view.

It is then a first objective of the coating composition disclosed in the present application to provide a coating that improves both the electrical and mechanical features of a material improving the electrical conductivity and the tensile strength.

It is an additional objective of the coating composition disclosed in the present application to provide a coating that improves both the thermal and mechanical features of a material improving the thermal conductivity and the tensile strength.

It is an additional objective of the coating composition disclosed in the present application to provide a coating that improves the thermal, electrical and mechanical features of a material improving the thermal and electrical conductivity and the tensile strength.

The present invention holds significant improvements over the prior art and serves as a novel liquid coating. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, "coat max" constructed and operative according to the teachings of the present invention.

The various embodiments of the present invention will hereinafter be described in conjunction with the appended drawings, wherein like designations denote like elements.

DETAILED DESCRIPTION

Figure 1:
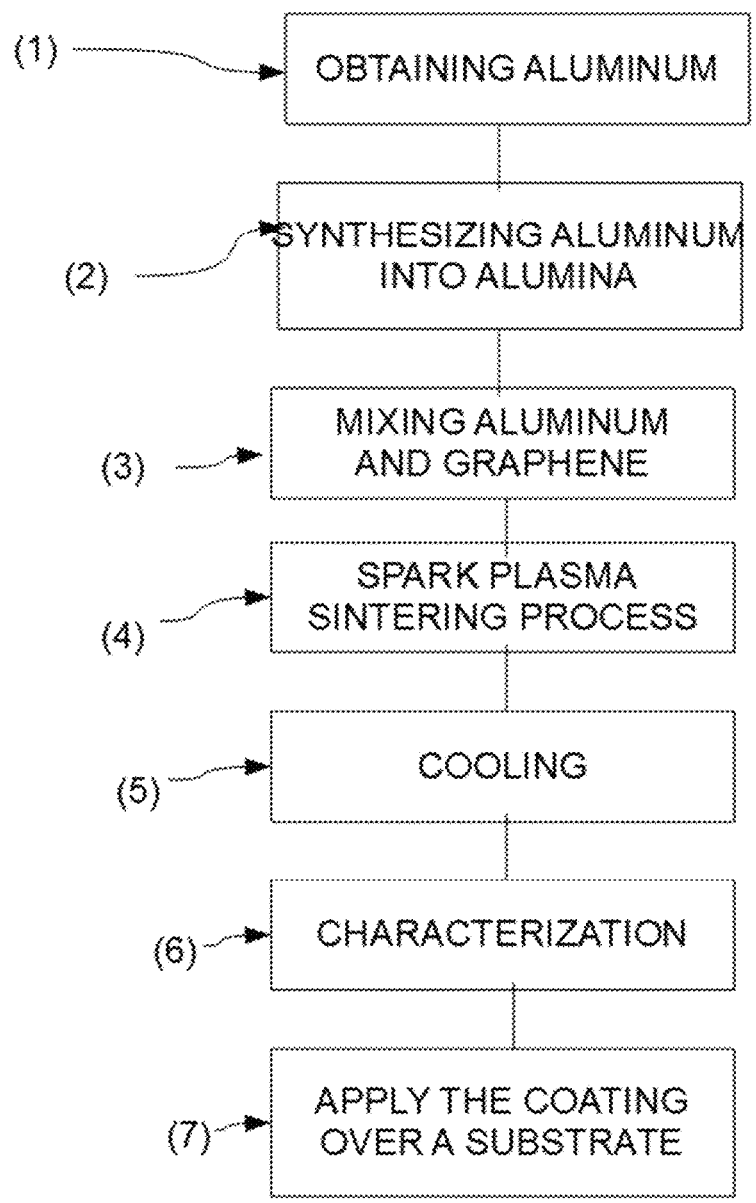
FIG. 1 is a flow chart of the steps for the synthesis of the novel coating compound "coat max" described in the present application, comprising the steps of: obtaining aluminum (1), synthesizing aluminum into alumina (2), mixing alumina with graphene oxide (3), apply a spark plasma sintering process (4), allow the newly synthesized coating compound to cool down (5), characterizing the newly synthesized coating compound (6), and applying said coating compound to the external surface of a substrate (7).
Figure 2:
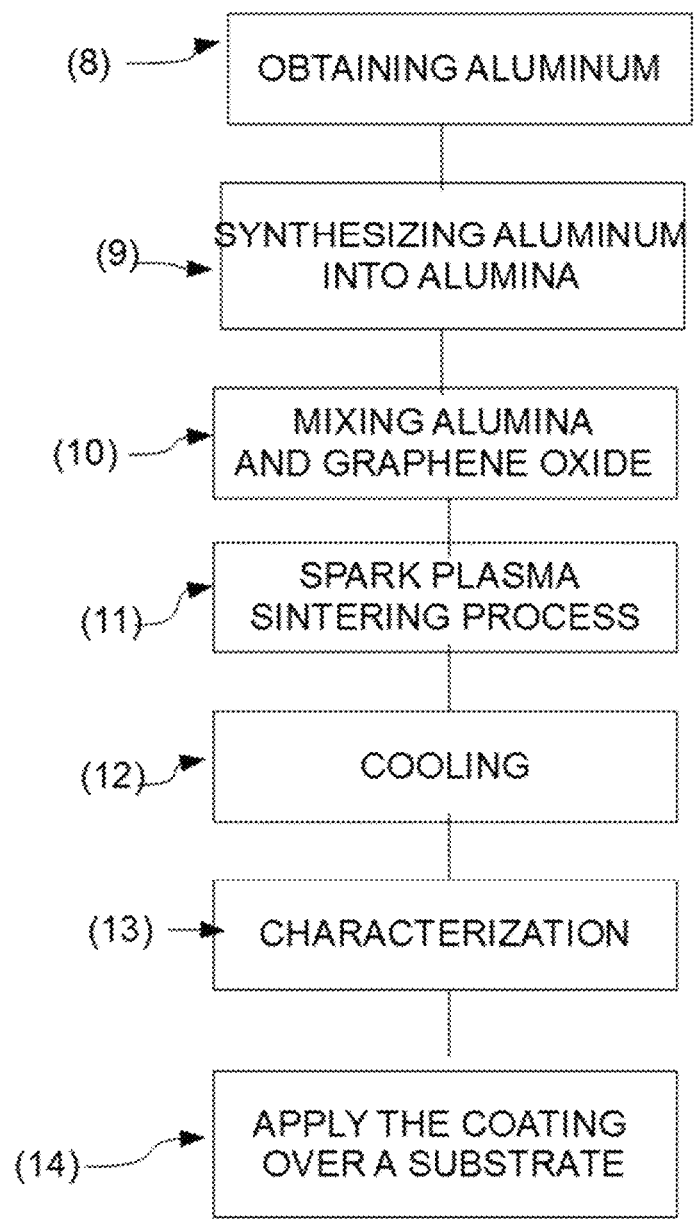
FIG. 2 is a flow chart of the steps for the synthesis of the novel coating compound "coat max" described in the present application, comprising the steps of: obtaining aluminum (8), synthesizing aluminum into alumina (9), mixing alumina with graphene (10), apply a spark plasma sintering process (11), allow the newly synthesized coating compound to cool down (12), characterizing the newly synthesized coating compound (13), and applying said coating compound to the external surface of a substrate (14).

As discussed above, embodiments of the present invention relate to a liquid coating composition and to the method of making it, and more particularly to a composition as used to improve graphene.

Generally speaking, graphene is an allotropic form of elemental carbon where three of the four valence electron are shared in covalent bonds with other carbon atoms and one is shared throughout the entire structure (literally delocalized). Covalent solids are usually not conductive. The other two forms of carbon, namely carbon graphite and carbon diamond, are not conductive. Graphene is, at least to some degree, a conductor of electricity.

Graphene properties though are not just the same of a regular conductor, such as a metal. For example, in a metal the shared electron can freely move throughout the material thus carrying heath or electricity. Graphene exhibits an electron mobility in excess of $1.5*10^4$ cm$^2$ V$^{-1}$ s$^{-1}$ corresponding to a resistivity of $10^{-6}$ Ωcm. Graphene may be commercially produced by thermal exfoliation, chemical vapor deposition, or epitaxial growth. In thermal exfoliation a small amount of graphite is heated up in a furnace at a temperature between 350° C. and 400° C. for a few minutes and let it blow up into a controlled container. In this way a finite powder of elemental carbon is obtained that can later be treated with acids to obtain graphene. Different kinds of chemical vapor deposition exist, but generally speaking elemental carbon is heated to its gas phase and deposed on a substrate, often referred as the wafer. Finally, epitaxial growth or epitaxy refers to the deposition of a crystalline overlayer on a crystalline substrate. The overlayer is called an epitaxial film or epitaxial layer. The process is similar to chemical vapor deposition, with the main difference that the substrate is a crystalline structure.

The three covalent bond formed by the carbon atom are coplanar, thus the repetition of a large number of carbon atoms having the same configuration form a honey-comb like structure based on the hexagonal shape having the carbon atoms at their corners, and the bonds on their sides, where said carbon atoms are separated by side distances or bond distances of $1.43*10^{-10}$ m. This honey-comb structure is the lattice structure typical of graphene, as opposed for example to the tetrahedral lattice found in carbon diamond or to the rhombohedral structure of graphite. Another way of characterizing graphene is with a single layer of hexagonal graphite.

Aluminum is a metal having atomic number (Z)=13. It crystalizes in a face centered cubic (f-cc) crystal. Aluminum has a relatively low density (d=2.7 g cm$^{-3}$). Aluminum is a good conductor having electric resistivity of $2.8*10^{-3}$ Ωcm. Aluminum is a relatively soft, durable, lightweight, ductile, and malleable metal with appearance ranging from silvery to dull gray, depending on the surface roughness.

Alumina is one of the oxides of Aluminum with chemical formula $Al_2O_3$. Alumina is an electrical insulator while it features a relatively high thermal conductivity. Density of Alumina is around 4 g cm$^{-3}$, while its thermal conductivity is 30 W·m$^{-1}$·K$^{-1}$. Typically, alumina is formed as a monolayer on aluminum surfaces as a result of atmospheric oxidation, thus limiting the ability of aluminum to further react. This phenomenon is known as the passivation of aluminum.

For the purpose of the present application the term graphene oxide is used to indicate a chemical compound formed by carbon, oxygen, and hydrogen only; graphene oxide is further characterized by a unique structure formed by only a few atomic layers in contrast with graphite oxide that feature a three dimensional structure.

Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

The process of making coat max, the novel coating material of the present application begins with graphene oxide, that can be obtained by oxidation of a commercially available bottled graphene solution. After mixing with alumina, a process known as spark plasma sintering (SPS) is carried out to homogenize the graphene/alumina mixture. A large electrical current is driven by SPS through the mixture with the final product ready in a few minutes.

Figure 3:
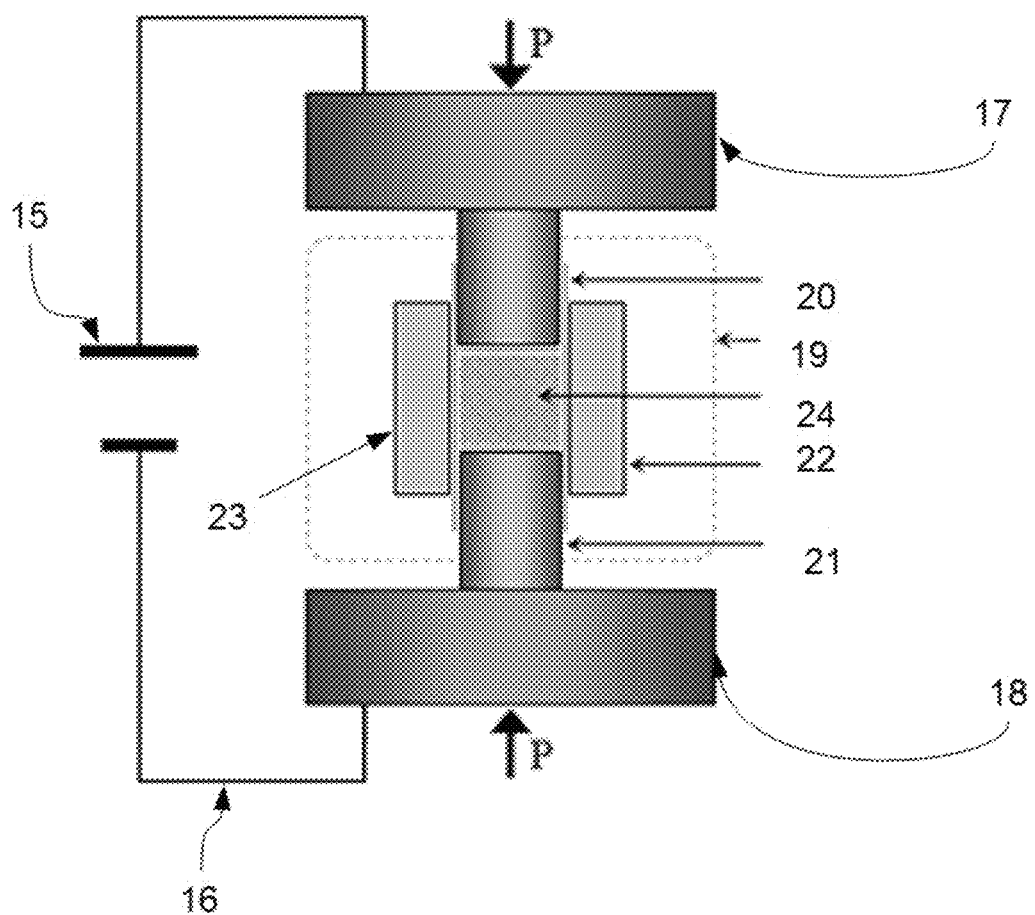
FIG. 3 shows a diagram of the SPS apparatus including a direct current generator (15), electrical circuitry (16), upper pressure piston (17), lower pressure piston (18), vacuum chamber (19) (in dotted lines), upper graphite electrode (20), lower graphite electrode (punch) (21), right graphite die (22), left graphite die (23), and sample chamber (24).

With reference to FIG. 3 SPS may be carried out in an apparatus that includes a direct current (DC) generator (15), electrical circuitry (16), upper pressure piston (17), lower pressure piston (18), vacuum chamber (19) (in dotted lines), upper graphite electrode (20), lower graphite electrode (punch) (21), right graphite die (22), left graphite die (23), and sample chamber (24). A mix of 75% aluminum and 25% graphene by mass is placed in sample chamber (24) then a large electrical current generated by DC generator (15) is let go through sample chamber (24) to raise the temperature of the sample up to at least 300° C. (preferably to 1,000° C.) by Jules effect. An optical pyrometer can be used to monitor the temperature of the alumina and graphene mix. Sufficient time is allowed to let the chemicals react together, and then the mixture is cooled down.

Alternatively, alumina ($Al_2O_3$) can be used instead of aluminum metal. Alumina can be either used as commercially available alumina or synthesized from its precursor. SOL-GEL methods of synthesizing alumina utilize aluminum chloride or aluminum tri-isopropylate are starting materials. Other processes of synthesizing alumina include oxidation of aluminum powders.

Spark Plasma Sintering is also referred as Pulse Electric Current Sintering (PECS), or Field Assisted Sintering Technique (FAST). It consists in having a large electrical direct current (DC) right inside the material. In the case of graphene, the current overheats the material that quickly reaches temperatures at which it becomes reactive. As graphene is mixed with aluminum or aluminum oxide it incorporates them into its honey comb structures so that their particles become part of its hexagonal matrix.

Adding graphene to alumina increases its conductivity approximately 100 million times. when graphene is added to alumina, there is an increase in the material's tensile strength, a property usually very low for ceramic materials. Graphene also has excellent thermal conductivity giving it the ability to guide heat in more desirable paths in electronic circuits. Just by adding as little as 0.22% of graphene to alumina made it 50% more resistant to the propagation of cracks under strain.

Other mechanical properties remained on par with untouched alumina, while electrical conductivity increased by a factor of a hundred million. the key benefit of graphene incorporation at minimal loadings to an $Al_2O_3$ matrix is that graphene makes $Al_2O_3$ electroconductive and also enhances toughness and mechanical properties. This is surprising as often when a second phase is incorporated in order to improve one specific property, the other properties are adversely affected.

Graphene sheets act like a shield preventing any cracks from propagating along that direction. Ceramic surfacing provides numerous advantages when applied by the broad range of ASB Industries' thermal spray processes. The available ceramic coating materials and chemistries have unique properties that are chosen for your specific application. Properties include durable wear life with corrosion resistance to many chemicals. Chemical resistance of oxide ceramic coatings used in high temperature environments will shield base materials from both vapor and liquid corrosion. Specific ceramic coatings are ideal for high- and low-voltage dielectrical applications including EMI shielding.

The key benefit of graphene incorporation at minimal loadings to an $Al_2O_3$ matrix is that graphene makes $Al_2O_3$ electroconductive and also enhances toughness and mechanical properties. This is surprising as often when a second phase is incorporated in order to improve one specific property, the other properties are adversely affected.

Possible applications of this technology include battery tanks for the oil field as it lowers the chance for tanks to be struck by lighting. Additionally, it could be used as a coating for tools and drill bits for hardware stores and for any construction tool ever used that corrodes. It can also be used for ball bearings and any bearings used that rust or corrodes.

It is of critical importance to improve toughness, strength, and wear-resistance together for the development of advanced structural materials. Herein, the inventor reports on the synthesis of oxidized and unoxidized graphene/alumina composite materials having enhanced toughness, strength, and wear-resistance by a low-cost and environmentally benign pressure-less-sintering process.

As it can be inferred from the description of the novel compound of the present application the mechanical, physical, thermal, and electrical features of any form of aluminum without the combination with graphene would be inferior compared to other kinds of metals. On the other hand, because of the addition of graphene, aluminum gets mechanical attributes similar to the ones of steel. The resulting aluminum containing compound then becomes a much stronger material.

Aluminum metal as well as graphene are great candidates for resisting corrosion because they are not permeable to gases. Because of this property of not being permeable to gases, the inventor infers that graphene acts to reinforce, in a way, aluminum metal. The novel coating compound described in the present application is designed to be more helpful and more cost effective then other commercially available coatings. The addition of graphene to aluminum generate unexpected results in terms of improving the mechanical, physical, thermal, and electrical properties of the material this making the novel coating described in the present application, literally a boost in a coating industry.

As described in the section titled "background of the invention", there are a lot of things that need to be coated to protect against weather, chemicals, gases, wearing down, and in some cases lightening strikes. Graphene builds up where aluminum coatings and other coatings break down, thus adding extra support. Graphene can greatly improve aluminum, alumina, and other coatings in similar ways. Aluminum is a metal and graphene, despite being composed by carbon, a nonmetal, has a lot of the same traits of steel so in a sense the inventor feels that by mixing aluminum metal with graphene is like bringing steel and metal together for a better product.

Alumina is great ceramic material for coatings. Graphene can be evenly mixed or dispersed in an alumina suspension thus making it easier for use since it can be mixed in many different ways. Alumina and graphene combine together to form one great product. The inventor passionately feels that everything that is improved by adding graphene to aluminum and alumina is what companies and people are looking for in ceramic coatings. Aluminum and alumina are much better materials to mix with graphene than most, and they can also be great alone. However, together they make an even better product.

In a first preferred embodiment the process to produce the novel coating compound with improved mechanical, thermal, and electrical characteristics, comprises the steps of: obtaining aluminum (1), synthesizing aluminum into alumina (2), mixing alumina with graphene oxide (3), apply a spark plasma sintering process (4), allow the newly synthesized coating compound to cool down (5), characterizing the newly synthesized coating compound (6).

The process may further comprise the step of applying said coating compound to the external surface of a substrate (7) such a drill bit, a piece of mechanical equipment, an oil rigging machine, or other metal tool.

The process of claim 1 where said step of characterizing the newly synthesized coating compound (6) is done by x-ray crystallography. X-ray crystallography is a tool used for identifying the atomic and molecular structure of a crystal, in which the crystalline atoms cause a beam of incident X-rays to diffract into many specific directions. By measuring the angles and intensities of these diffracted beams, a crystallographer can produce a three-dimensional picture of the density of electrons within the crystal. From this electron density, the mean positions of the atoms in the crystal can be determined, as well as their chemical bonds, their disorder and various other information.

The process of synthesizing aluminum into alumina (2) may be is done by a SOL-GEL process. The sol-gel process is a wet-chemical technique used for the fabrication of both glassy and ceramic materials. In this process, the sol (or solution) evolves gradually towards the formation of a gel-like network containing both a liquid phase and a solid phase. In a sol-gel process, rather than aluminum metal either aluminum tri-chloride or aluminum triiso-propylate are used as aluminum containing compounds.

Alternatively, graphene may be used instead of graphene oxide, therefore the sequence of steps of the process to make a novel coating compound with improved mechanical, thermal, and electrical characteristics becomes: obtaining aluminum (8), synthesizing aluminum into alumina (9), mixing alumina with graphene (10), apply a spark plasma sintering process (11), allow the newly synthesized coating compound to cool down (12), and characterizing the newly synthesized coating compound (13). Similarly to the case of the first embodiment, the process utilizing graphene instead of graphene oxide may comprise the step of applying said coating compound to the external surface of a substrate 12.

The new coating material originated with either of the processes above becomes a novel coating compound comprising a carbon containing compound and an aluminum containing compound, where said carbon containing compound may either be graphene or graphene oxide and where said aluminum containing compound may either be aluminum metal in its zero oxidation state, or alumina. In a separate preferred embodiment of the new coating material of the instant application the carbon containing compound is 25% of the total mass and the aluminum containing compound is 75% of the total mass.

It should be noted that the steps described in the method of use can be carried out in many different orders according to user preference. The use of "step of" should not be interpreted as "step for", in the claims herein and is not intended to invoke the provisions of 35 U.S.C. § 112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A process to make a novel coating compound with improved mechanical, thermal, and electrical characteristics comprising the steps of:
   (a) obtaining aluminum (1),
   (b) synthesizing aluminum into alumina (2),
   (c) mixing alumina with graphene oxide into a coating compound (3),
   (d) apply a spark plasma sintering process (4),
   (e) allow said coating compound to cool down (5),
   (f) characterizing the newly synthesized coating compound (6); and
   (g) applying said coating compound to an external surface of a substrate (7).

2. The process of claim 1 where said step of characterizing the newly synthesized coating compound (6) is done by x-ray crystallography.

3. The process of claim 1 where said step of synthesizing aluminum into alumina (2) is done by a SOL-GEL process.

4. The process of claim 3 where said aluminum is in the form of aluminum tri-chloride.

5. The process of claim 3 where said aluminum is in the form of aluminum triiso-propylate.

6. A process to make a novel coating compound with improved mechanical, thermal, and electrical characteristics comprising the steps of:
   (a) obtaining aluminum (8),
   (b) synthesizing aluminum into alumina (9),
   (c) mixing alumina with graphene into a coating compound (10),
   (d) apply a spark plasma sintering process (11),
   (e) allow said coating compound to cool down (12),
   (f) characterizing the newly synthesized coating compound (13); and
   (g) synthesizing aluminum into alumina (2) is done by a SOL-GEL process.

7. The process of claim 6 further comprising the step of applying said coating compound to an external surface of a substrate (14).

8. The process of claim 6 where said step of characterizing the newly synthesized coating compound (6) is done by x-ray crystallography.

9. The process of claim 6 where said aluminum is in the form of aluminum tri-chloride.

10. The process of claim 6 where said aluminum is in the form of aluminum tri iso-propylate.

* * * * *